US006997033B2

(12) United States Patent
Schlosser et al.

(10) Patent No.: US 6,997,033 B2
(45) Date of Patent: Feb. 14, 2006

(54) FLOW METER PICKOFF ASSEMBLY AND FLOW METER PICKOFF ADJUSTMENT METHOD FOR NULLING FLOW METER ZERO OFFSET

(75) Inventors: Martin Andrew Schlosser, Boulder, CO (US); Joseph C. Dille, Telford, PA (US); Daniel Patrick McNulty, Westminster, CO (US); Charles E. Priday, Westminster, CO (US)

(73) Assignee: Emerson Electric Co., St. Louis, MO (US)

( * ) Notice: Subject to any disclaimer, the term of this patent is extended or adjusted under 35 U.S.C. 154(b) by 149 days.

(21) Appl. No.: 10/771,273

(22) Filed: Feb. 3, 2004

(65) Prior Publication Data

US 2005/0166661 A1 Aug. 4, 2005

(51) Int. Cl.
*G01F 25/00* (2006.01)
(52) U.S. Cl. ....................................... 73/1.34
(58) Field of Classification Search ................. 73/1.16, 73/1.34, 861.354, 861.355, 861.356, 861.357
See application file for complete search history.

(56) References Cited

U.S. PATENT DOCUMENTS

| | | | |
|---|---|---|---|
| 5,228,327 A | 7/1993 | Bruck | |
| 5,231,884 A | 8/1993 | Zolock | |
| 5,331,859 A | 7/1994 | Zolock | |
| 6,230,104 B1 | 5/2001 | Shelley et al. | |
| 6,272,438 B1 | 8/2001 | Cunningham et al. | |

*Primary Examiner*—Robert Raevis
(74) *Attorney, Agent, or Firm*—Setter Ollila LLC

(57) ABSTRACT

A flow meter pickoff assembly for nulling a flow meter zero offset is provided. The flow meter pickoff assembly includes a mounting device affixed to a first flow meter portion of a flow meter and a first pickoff sensor half adjustably affixed to the mounting device and configured to interact with a second pickoff sensor half affixed to a second flow meter portion. At least one relative angle of the first pickoff sensor half in relation to the second pickoff sensor half can be adjusted by adjusting the first pickoff sensor half to the mounting device according to at least one adjustment axis. The flow meter pickoff assembly further includes an adjustment means for enabling the first pickoff sensor half to adjust with respect to the mounting device along the at least one adjustment axis in order to adjust the at least one relative angle.

32 Claims, 15 Drawing Sheets

FLOW METER PICKOFF ASSEMBLY AND FLOW METER PICKOFF ADJUSTMENT METHOD FOR NULLING FLOW METER ZERO OFFSET

BACKGROUND OF THE INVENTION

1. Field of the Invention

The present invention relates to a flow meter, and more specifically to a flow meter pickoff assembly and flow meter pickoff adjustment method for nulling a flow meter zero offset.

2. Statement of the Problem

It is known to use Coriolis mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit. The vibrational modes of the material filled systems are defined in part by the combined mass of the flow tubes and the material within the flow tubes.

When there is no material flowing through the flow meter, all points along a flow tube oscillate with an identical phase. As a material begins to flow through the flow tube, Coriolis forces cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. A phase difference of the signals received from the sensors is calculated in units of time. The phase difference between the sensor signals is proportional to the mass flow rate of the material flowing through the flow tube or flow tubes.

However, there can be inaccuracy in this phase difference. One source of error can come from imperfections in the flowtube apparatus. Another source of error can come from improperly aligned sensor components. Yet another source of error can come from variability in the meter electronics.

One way of detecting inaccuracy in the flow meter is by vibrating the empty flowtube apparatus and measuring the resulting phase difference. This phase difference in the flowtube apparatus, such as for air, for example, is termed a zero offset. Ideally, the zero offset will be zero for a no flow condition (i.e., for air). However, this is usually not the case. Multiple manufacturing tolerances, material variations, improper sensor alignments, and electronic component tolerances can combine to produce a zero offset ranging away from ideal. In addition, the zero offset can be affected by temperature. Unfortunately, the greater the zero offset, the more the zero offset is likely to be affected by temperature.

Although the FCF is currently compensated for these temperature effects, the zero offset is typically not adjustable in a prior art flow meter and the zero offset cannot be mechanically compensated. In the prior art, the problem is typically approached by the user of the flow meter being required to re-zero the flow meter when the temperature changes by more than 20 degrees Centigrade.

Significant work has been done over the years relating to the reduction and/or elimination of zero offset in Coriolis flow meters. The prior art has taken two approaches. The first prior art approach has been to minimize the zero offset of a flow meter through small tolerances and rigorous manufacturing methods. The second prior art approach has been to address the zero offset problem through advanced signal processing, such as modal filtering, compensating for residual flexibility, etc. However, both prior art approaches are costly, complex, and not satisfactorily accurate and successful.

SUMMARY OF THE SOLUTION

The above and other problems are solved and an advance in the art is achieved through the provision of a flow meter and method for nulling a flow meter zero offset.

A flow meter pickoff assembly for nulling a flow meter zero offset is provided according to an embodiment of the invention. The flow meter pickoff assembly comprises a mounting device affixed to a first flow meter portion of a flow meter and a first pickoff sensor half adjustably affixed to the mounting device and configured to interact with a second pickoff sensor half affixed to a second flow meter portion. At least one relative angle of the first pickoff sensor half in relation to the second pickoff sensor half can be adjusted by adjusting the first pickoff sensor half to the mounting device according to at least one adjustment axis. The flow meter pickoff assembly further comprises an adjustment means for enabling the first pickoff sensor half to adjust with respect to the mounting device along the at least one adjustment axis in order to adjust the at least one relative angle.

A flow meter pickoff adjustment method for nulling a flow meter zero offset is provided according to an embodiment of the invention. The method comprises affixing a mounting device to a first flow meter portion of a flow meter and adjustably affixing a first pickoff sensor half to the mounting device. The first pickoff sensor half is configured to interact with a second pickoff sensor half affixed to a second flow meter portion. At least one relative angle of the first pickoff sensor half in relation to the second pickoff sensor half can be adjusted by adjusting the first pickoff sensor half to the mounting device according to at least one adjustment axis. The method further comprises providing an adjustment means for enabling the first pickoff sensor half to adjust with respect to the mounting device along the at least one adjustment axis in order to adjust the at least one relative angle.

DESCRIPTION OF THE DRAWINGS

The same reference number represents the same element on all drawings. The drawings are not necessarily to scale.

DETAILED DESCRIPTION OF THE INVENTION

FIGS. 1–16 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
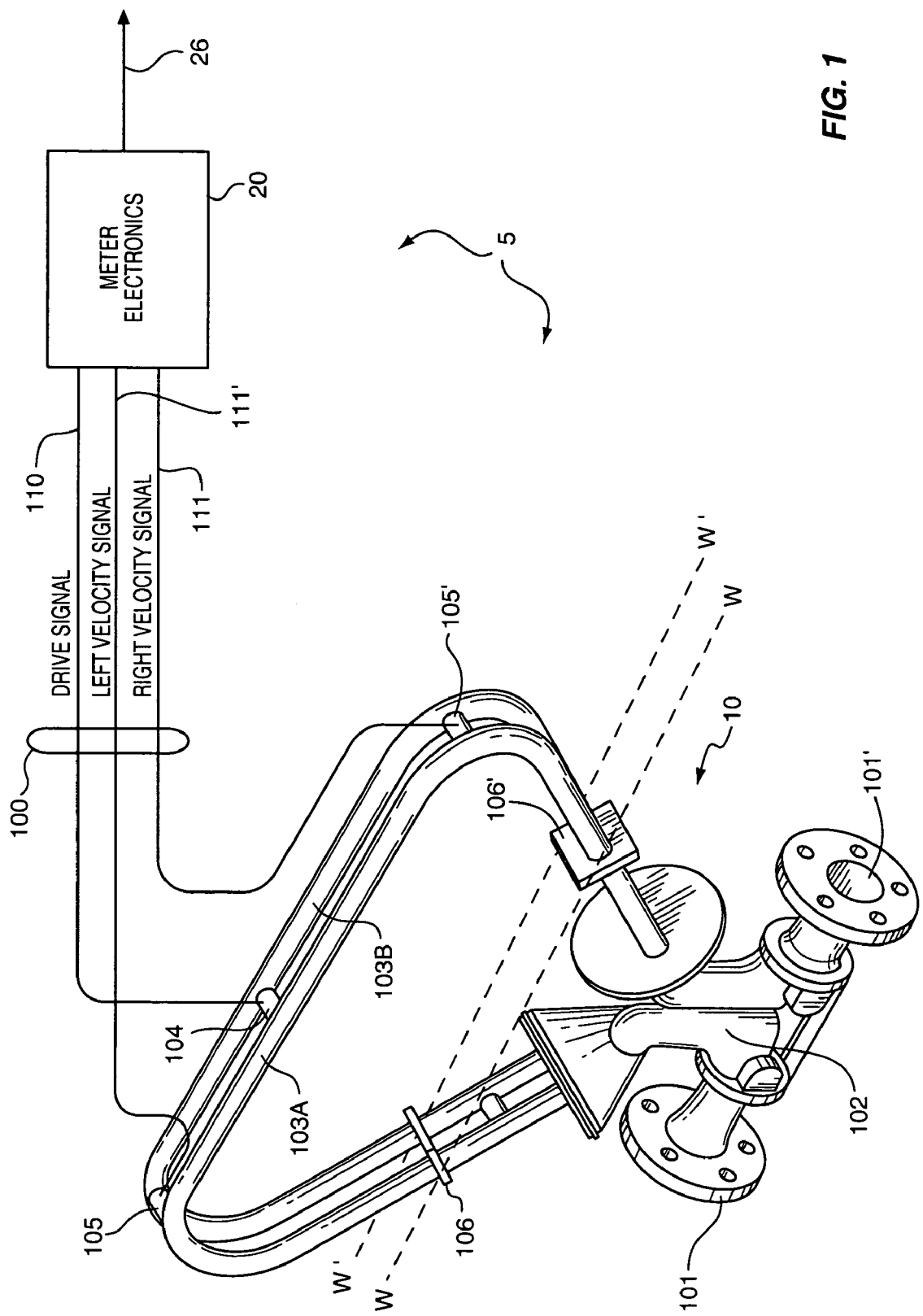
FIG. 1 illustrates a Coriolis flow meter comprising a flow meter assembly and meter electronics.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow and other information over path 26. Flow meter assembly 10 includes a pair of flanges 101 and 101', manifold 102 and flow tubes 103A and 103B. Connected to flow tubes 103A and 103B are driver 104 and pick-off sensors 105 and 105'. Brace bars 106 and 106' serve to define the axes W and W' about which each flow tube 103A and 103B oscillates.

When flow meter assembly 10 is inserted into a pipeline system (not shown) which carries the material being measured, material enters flow meter assembly 10 through flange 101, passes through manifold 102 where the material is directed to enter flow tubes 103A and 103B, flows through flow tubes 103A and 103B, and back into manifold 102 where it exits meter assembly 10 through flange 101'.

Flow tubes 103A and 103B are selected and appropriately mounted to manifold 102 so as to have substantially the same mass distribution, moment of inertia, and elastic modulus about bending axes W—W and W'—W' respectively. The flow tubes extend outwardly from the manifold in an essentially parallel fashion.

Flow tubes 103A–B are driven by driver 104 in opposite directions about their respective bending axes W and W' and at what is termed the first out of phase bending mode of the flow meter. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The force pattern generated by driver 104 is fixed over the life of the sensor (i.e., $C_p$ is constant). Driver 104 generates a constant force and the pick-offs 105 or 105' measure the tube displacement.

Meter electronics 20 receives the right and left velocity signals appearing on leads 111 and 111', respectively and the tube displacement over lead 112. Meter electronics 20 produces the drive signal on lead 110 which causes driver 104 to oscillate the flow tubes 103A and 103B. The present invention as described herein can produce multiple drive signals from multiple drivers. Meter electronics 20 processes left and right velocity signals and a tube displacement signal to compute mass flow rate and provide the validation system of the present invention. Path 26 provides an input and an output means that allows meter electronics 20 to interface with an operator.

Figure 2:
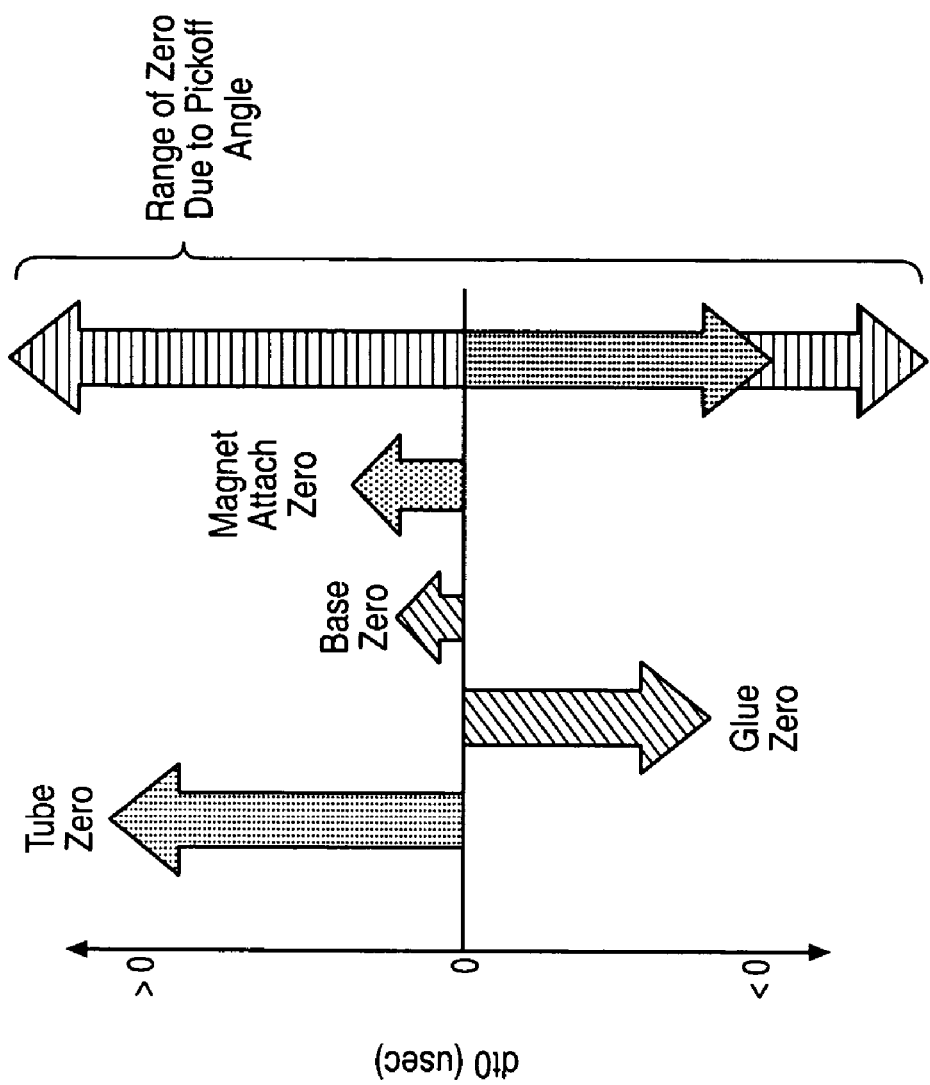
FIG. 2 is a chart of some of the factors that affect a flow meter zero offset.

FIG. 2 is a chart of some of the factors that affect a flow meter zero offset. The zero offset can be affected by the flowtube geometry and manufacturing tolerances (depicted by the tube zero arrow), variations in the attachment of the magnet base to a flowtube (depicted by the base zero arrow), variations in the magnet attachment angle to the flowtube (depicted by the magnet attach zero arrow), and flexing/ changes in a mounting glue (depicted by the glue zero arrow) due to changes in an ambient temperature, pressure, etc. These various factors in some cases will cancel each other out to some degree, but alternately can add together to produce a large zero offset value. As previously discussed, the approach in the prior art has been to measure the zero offset at the factory and simply reject flow meters that have a zero offset that is greater than an acceptable threshold. This is costly and inefficient.

Figure 3:
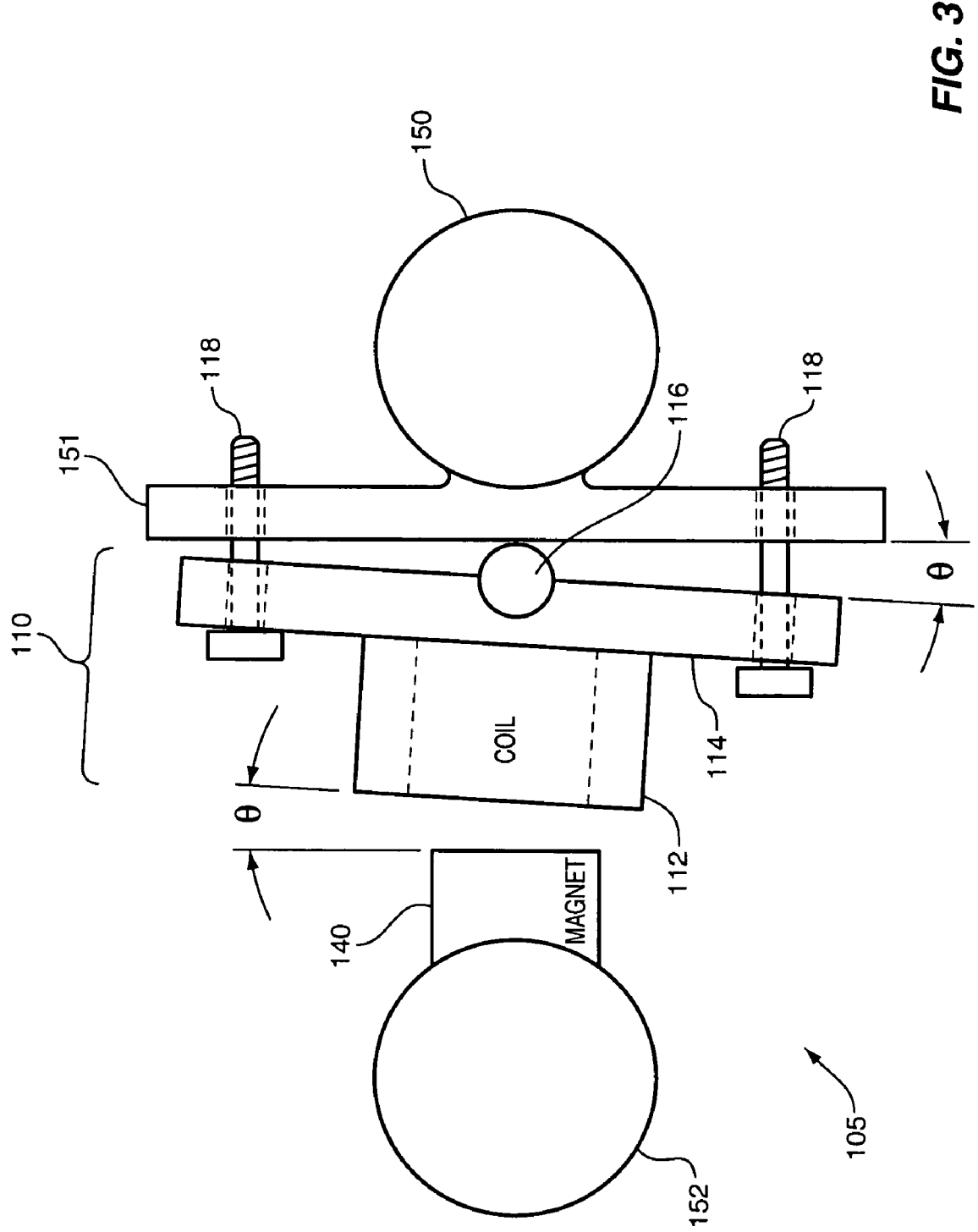
FIG. 3 shows a flow meter pickoff assembly according to an embodiment of the invention.

FIG. 3 shows a flow meter pickoff assembly 105 according to an embodiment of the invention. The flow meter pickoff assembly 105 includes a first pickoff sensor half 110 and a second pickoff sensor half 140. The first pickoff sensor half 110 can be affixed to a first flow meter portion 150, such as a flowtube 150 of a flow meter apparatus, for example. The first pickoff sensor half 110 can be affixed to the first flow meter portion 150 by a mounting device 151, such as a bracket, a flange, a U-bolt clamp, etc. The mounting device 151 can be affixed to the first flow meter portion 150 by a weld, glue, clamping, etc.

The second pickoff sensor half 140 can likewise be affixed to a second flow meter portion 152. In the case of a single flowtube flow meter, the second pickoff sensor half 140 can be affixed to a second flow meter portion 152 such as a flange, casing, brace bar, etc. Alternatively, it should be understood that the pickoff halves can be swapped and the mounting device 151 can be affixed to the second flow meter portion 152.

In order to compensate for or to eliminate a zero offset characteristic of the flow meter, it is desirable to be able to adjust at least a relative angle θ between the first pickoff sensor half 110 and the second pickoff sensor half 140. For example, the relative angle θ may need to be eliminated in order to minimize or eliminate the zero offset. In the past, the relative angle θ was minimized only through rigorous manufacturing and quality control procedures. However, according to the invention, the first pickoff sensor half 110 can be moved and therefore at least the relative angle θ can be adjusted. The relative angle θ can be adjusted while monitoring or measuring the zero offset. The zero offset therefore can be accurately compensated for on an individual meter basis, under test conditions.

The first pickoff sensor half 110 in the embodiment shown includes a sensor portion 112 affixed to a base 114 and an adjustment means 116. The sensor portion 112 can comprise a magnet coil. It should be understood that although the sensor portion 112 is shown as a magnet coil and the second pickoff sensor half 140 is shown as a magnet (such as a permanent magnet), the first and second pickoff sensor halves 110 and 140 can be interchanged.

The adjustment means 116 is positioned between the first pickoff sensor half 110 and the mounting device 151. The adjustment means 116 can be clamped between the two portions, can be part of the base 114, or can be part of the mounting device 151. The first pickoff sensor half 110 is removably and adjustably affixed to the mounting device 151 by one or more fasteners 118. Through the combination of the adjustment means 116 and the one or more fasteners 118, the orientation of the first pickoff sensor half 110 can be adjusted in relation to the mounting device 151. The orientation adjustment is accomplished in one embodiment by screwing the fasteners 118 into or out of the mounting device 151 in order to change at least the relative angle θ.

The adjustment means 116 in one embodiment comprises a protrusion. The adjustment means 116 can comprise a rib, ridge, or other elongated shape extending from the base 114. The adjustment means 116 can be formed of a material having a sufficient hardness wherein the adjustment means 116 does not deform or shift under load of adjustment. In addition, the hardness can ensure that the pickoff assembly alignment and spacing does not change over time. In one embodiment, the adjustment means 116 comprises a length of dowel, such as a metal dowel. The dowel can be chosen according to a desired cost and tolerance. A small diameter metal dowel can provide a sufficient material hardness and can result in minimal lateral movement at time of adjustment. The adjustment means 116 can extend partially or fully across the base 114 (see FIG. 5) or can extend partially or fully across the mounting device 151. Such an elongated shape generally permits motion of the base 114 along only one axis, especially if two fasteners 118 are used, as shown. The axis of motion in this embodiment extends vertically out of the figure, parallel to the adjustment means 116, and allows the relative angle θ to be adjusted.

In another embodiment, the adjustment means 116 comprises a substantially semi-hemispherical bump, a substantially conical bump, a substantially pyramidal bump, etc. In these embodiments, the first pickoff sensor half 110 can be adjusted in two dimensions, i.e., along a vertical axis Y and along a horizontal axis X that generates the relative angle θ (see FIG. 6). Three or more fasteners 118 can be used to affix the base 114 to the mounting device 151 in these embodiments and therefore allow orientation adjustment along the two adjustment axes.

The adjustment means 116 in any of the various embodiments can be formed of any material. In one embodiment, the adjustment means 116 comprises part of the base 114 and is formed of the same material. In another embodiment, the adjustment means 116 is formed of a different material than the base 114 and is bonded to the base 114, is cast into the base 114, etc. In one alternative embodiment, the adjustment means 116 is similarly formed on or as part of the mounting device 151. In another alternative embodiment, the adjustment means 116 is a separate component that is merely clamped between the first pickoff sensor portion 110 and the mounting device 151.

In one embodiment, the adjustment means 116 is formed of an at least partially compressible or deformable material. As a result, the distance between the base 114 and the mounting device 151 can be modified (i.e., the adjustment means 116 can be squeezed down if the first pickoff sensor half 110 is to be moved closer to the mounting device 151). In addition, the deformation of the adjustment means 116 can also allow the orientation of the first pickoff sensor half 110 to be adjusted.

Figure 4:
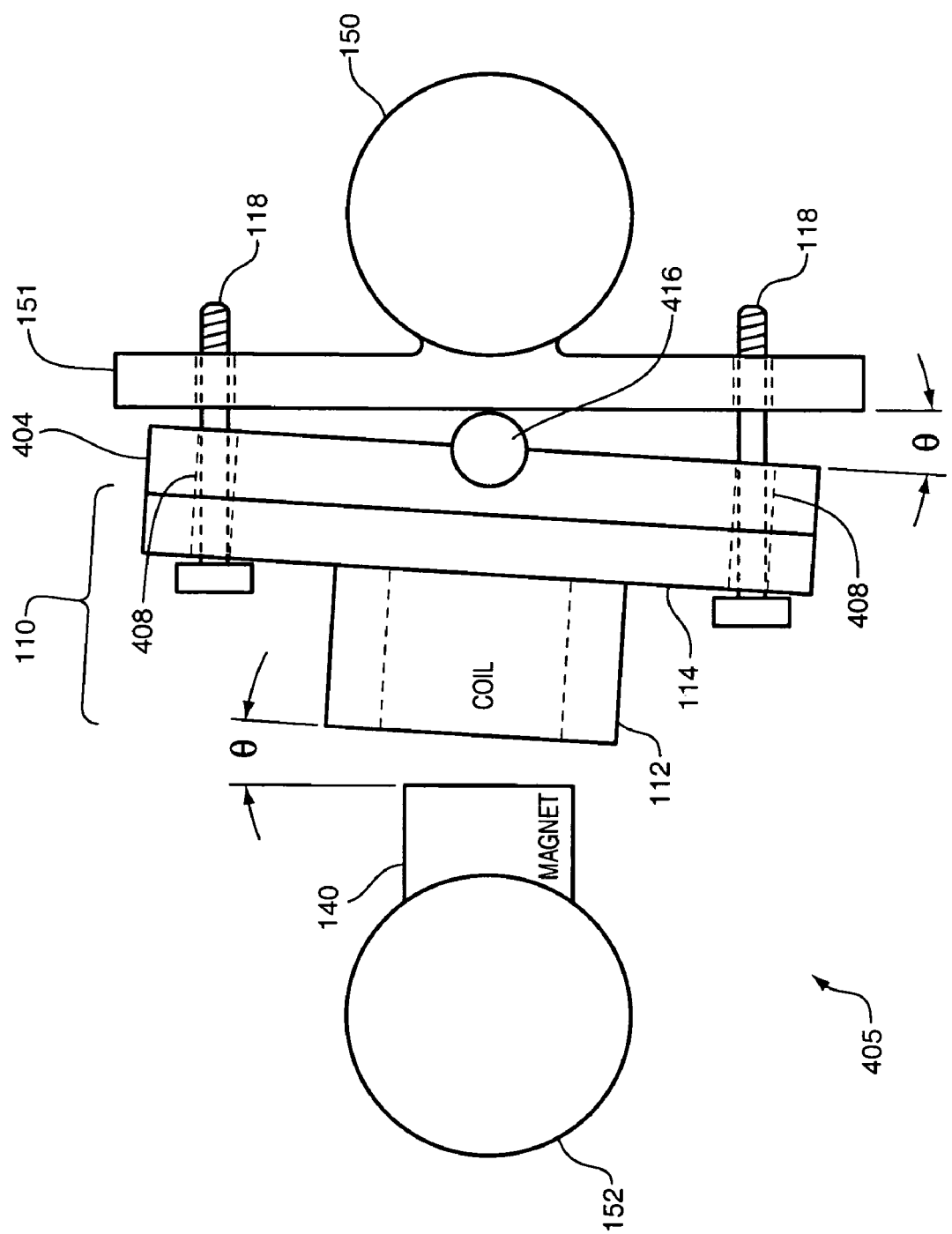
FIG. 4 shows a flow meter pickoff assembly according to another embodiment of the invention.

FIG. 4 shows a flow meter pickoff assembly 405 according to another embodiment of the invention. In this embodiment, the flow meter pickoff assembly 405 further includes a spacer 404 positioned between the first pickoff sensor half 110 and the mounting device 151. The spacer 404 has a thickness and includes an adjustment means 416. The spacer 404 therefore can be used with a conventional first pickoff sensor half 110 and enables the orientation of the conventional first pickoff sensor half 110 to be adjusted in relation to the mounting device 151, as previously discussed. The spacer 404 in one embodiment is formed of an electrically non-conductive material and therefore electrically isolates the first pickoff sensor half 110 from the first flow meter portion 150. The spacer 404 can include fastener apertures 408 that are used to hold the spacer 404 between the first pickoff sensor half 110 and the mounting device 151. Alternatively, in another embodiment the spacer 404 fits between the fasteners 118 and is clamped between the first pickoff sensor half 110 and the mounting device 151.

Figure 5:
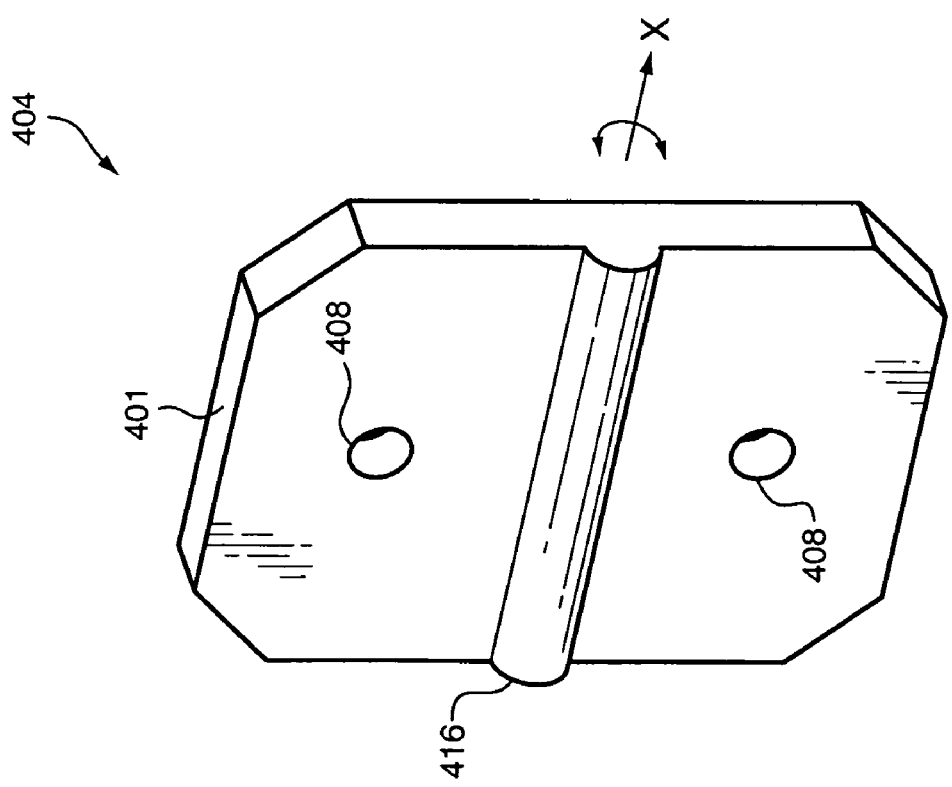
FIG. 5 shows a spacer according to an embodiment of the invention.

FIG. 5 shows a spacer 404 according to an embodiment of the invention. In this embodiment, the spacer 404 includes a body 401, two fastener apertures 408, and a transverse, elongated adjustment means 416 in the shape of a rib. The adjustment means 416 enables the spacer 404 to pivot along only one adjustment axis X (see figure). The spacer 404 can therefore be used to adjust one angle, i.e., the relative angle θ shown in FIGS. 3 and 4. The spacer 404 in one embodiment is formed of a material that provides a sufficient stiffness so that the spacer 404 does not deflect or deform during adjustment so that the first pickoff sensor half 110 cannot improperly or undesirably contact the second pickoff sensor half 140.

Figure 6:
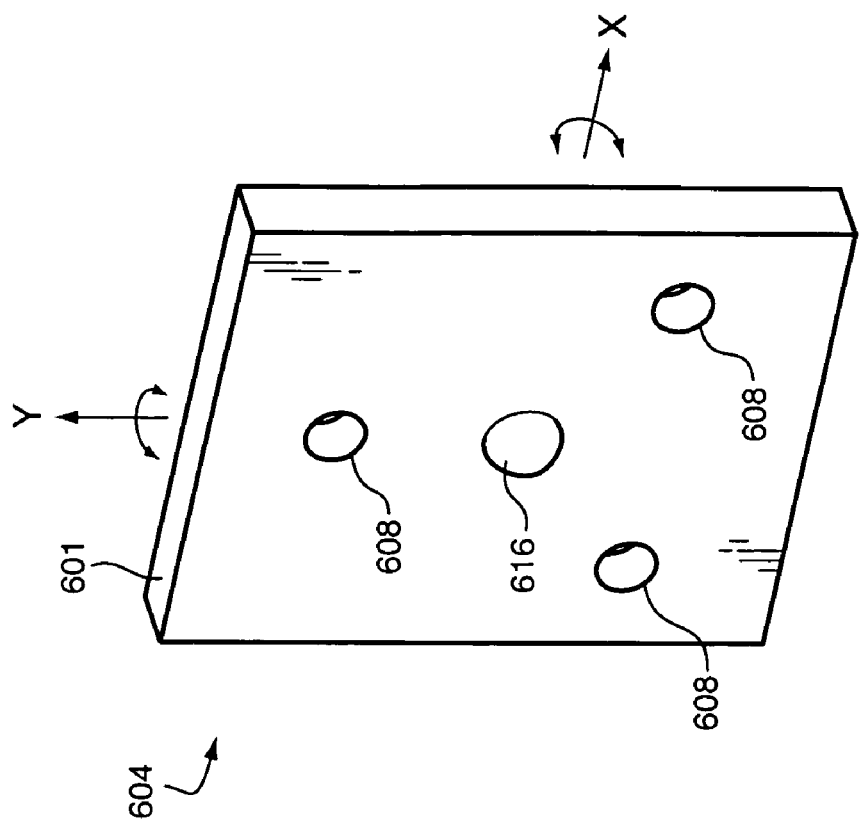
FIG. 6 shows a spacer according to an embodiment of the invention.

FIG. 6 shows a spacer 604 according to an embodiment of the invention. In this embodiment, the spacer 604 includes a body 601, three or more fastener apertures 608, and a bump-type adjustment means 616. The bump-type adjustment means 616 enables the spacer 604 to pivot according to two adjustment axes X and Y. The spacer 604 can therefore be used to fully adjust the orientation of the first pickoff sensor half 110 in relation to the mounting device 151.

Figure 7:
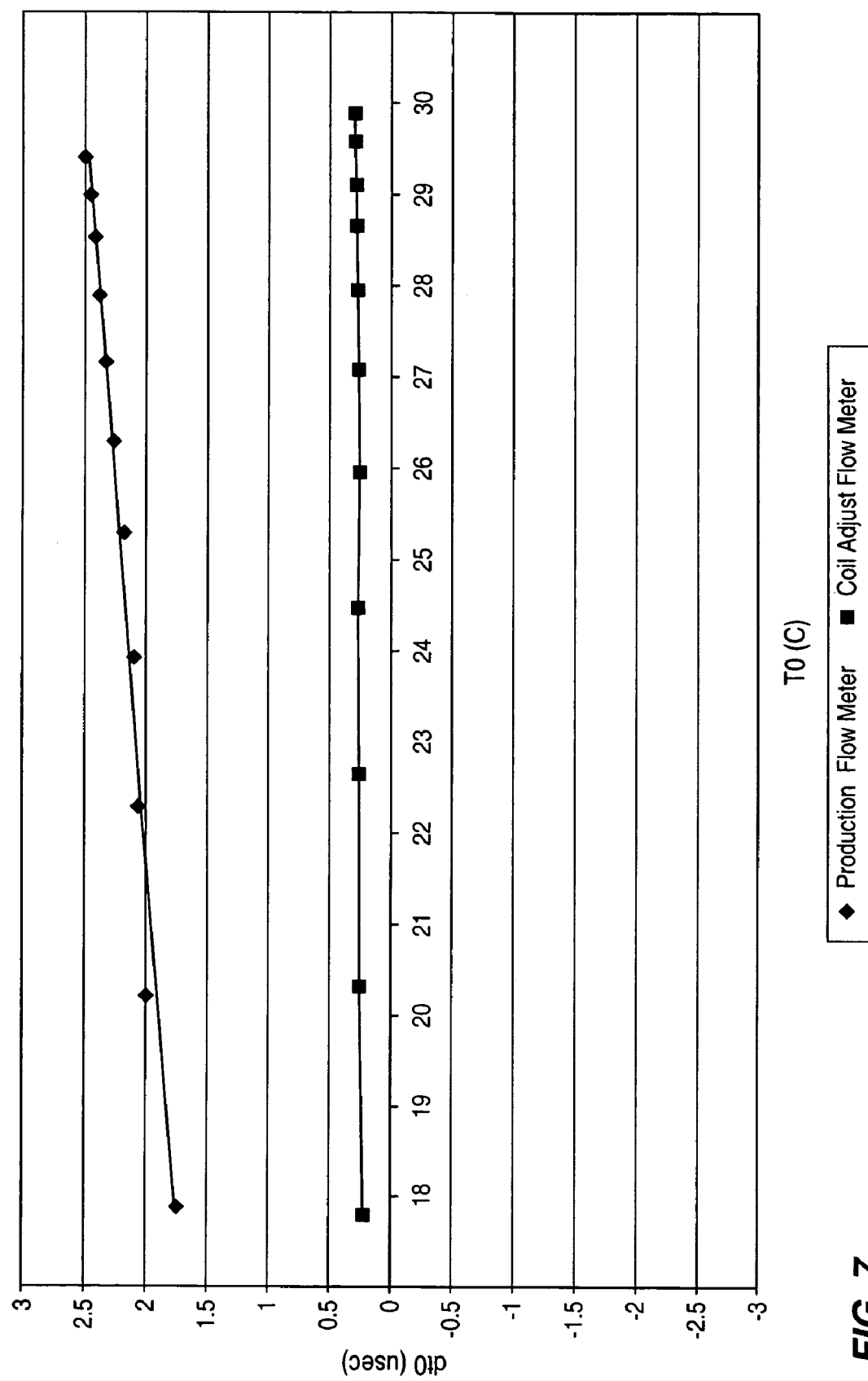
FIG. 7 is a chart of a flowtube apparatus without any zero offset compensation (upper line) and a flowtube apparatus wherein the zero offset is compensated for by adjusting the relative angle θ (lower line)

FIG. 7 is a chart of a flowtube apparatus without any zero offset compensation (upper line) and a flowtube apparatus wherein the zero offset is compensated for by adjusting the relative angle θ (lower line). It can be seen from the graph that by compensating for the zero offset, the zero offset changes very little over the measured temperature range. In contrast, the upper line, having no zero offset compensation, shows how the zero offset can vary an undesirable amount over a particular temperature range, affecting the accuracy of the flow meter. This temperature range is generally very small for traditional metal flow meters. The data shown in the figure is for a plastic flow meter, for which the zero offset temperature effect is approximately 100 times the temperature zero offset for a metal flow meter.

Figure 8:
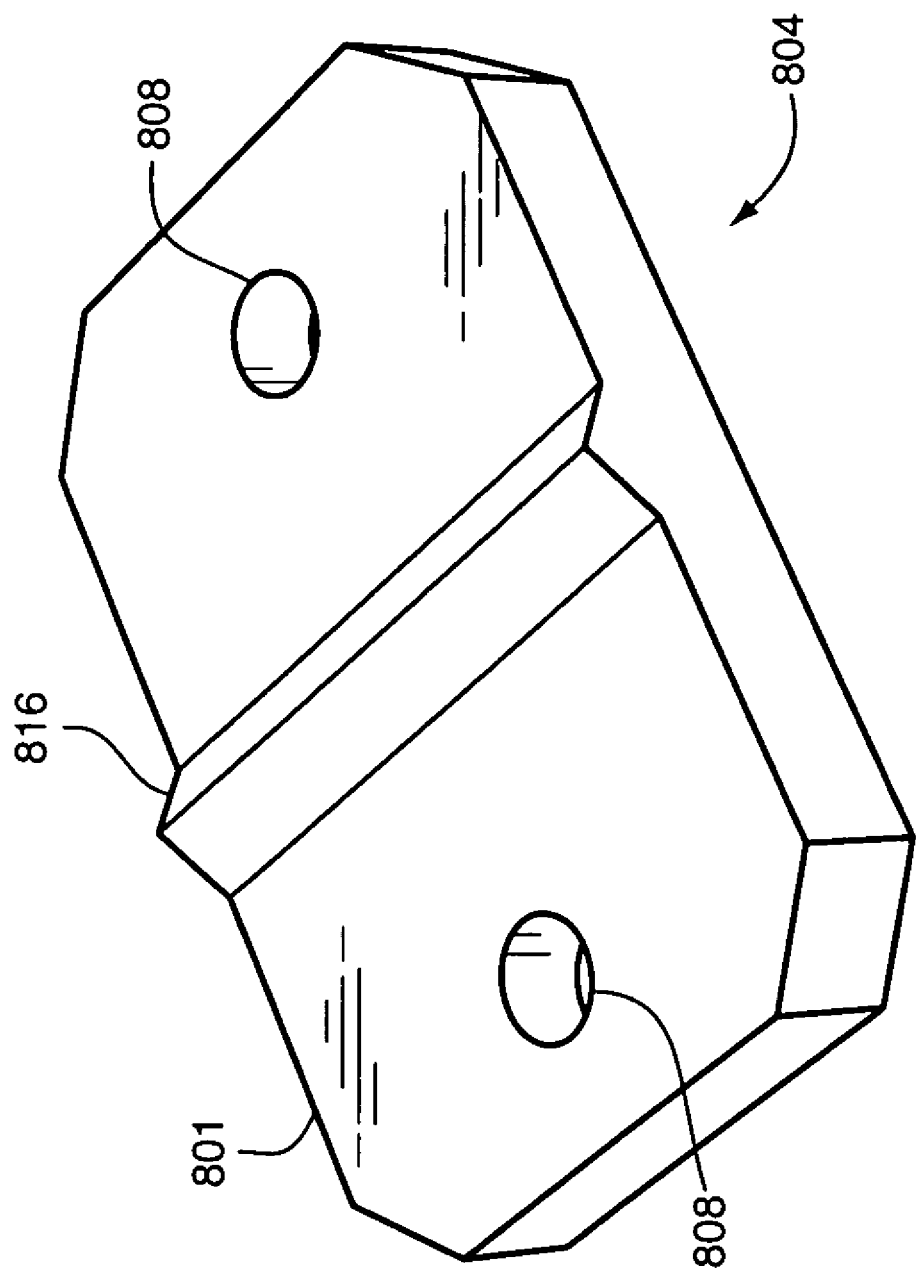
FIG. 8 shows a spacer according to another embodiment of the invention.

FIG. 8 shows a spacer 804 according to another embodiment of the invention. In this embodiment, the adjustment means 816 comprises a substantially sharp-edged rib and has a substantially triangular or non-circular cross-section. The cross-section can alternatively be rectangular or even irregular in shape. Alternatively, the adjustment means 816 can be formed of bevels, curved faces, or angled faces formed on the body 801. As was previously discussed, the adjustment means 816 can comprise a separate element bonded to or formed in the body 801 or can comprise a portion of the spacer 804.

Figure 9:
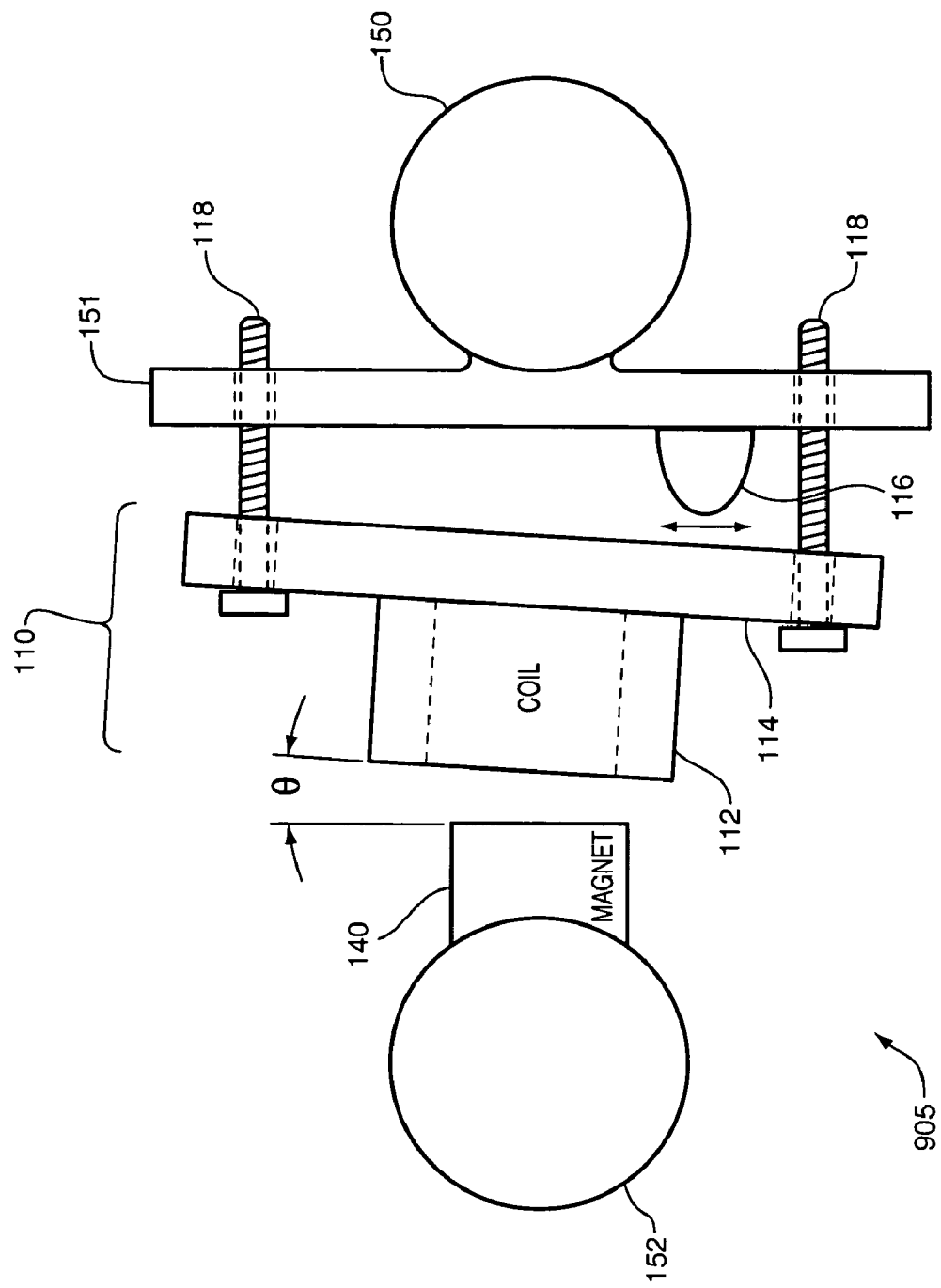
FIG. 9 shows a flow meter pickoff assembly wherein the adjustment means comprises a rib or protrusion that can be moved with respect to the mounting device.

FIG. 9 shows a flow meter pickoff assembly 905 wherein the adjustment means 116 comprises a rib or protrusion that can be moved with respect to the mounting device 151. As a result, two or more fasteners 118 can clamp the first pickoff sensor half 110 to the mounting device 151 at various orientations.

Figure 10:
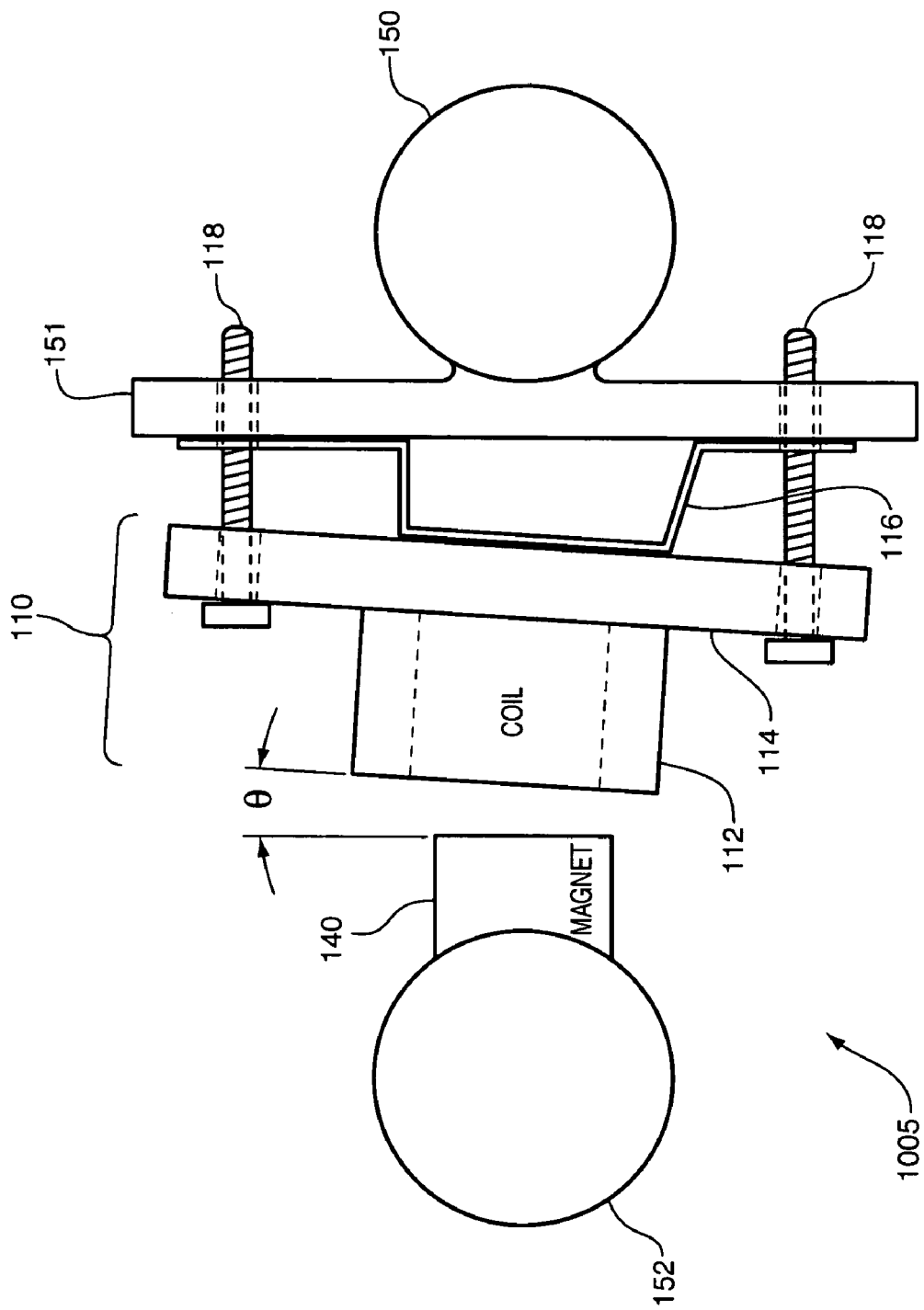
FIG. 10 shows a flow meter pickoff assembly wherein the adjustment means comprises a deformable spacing shape.

FIG. 10 shows a flow meter pickoff assembly 1005 wherein the adjustment means 116 comprises a deformable spacing shape 116. The deformable spacing shape 116 can be compressed by two or more fasteners 118 in order to achieve a desired orientation of the first pickoff sensor half 110. The deformation can occur along one or two adjustment axes, depending on the number and location of the fasteners 118. The deformable spacing shape 116 can optionally be formed of a resilient, deformable material.

Figure 11:
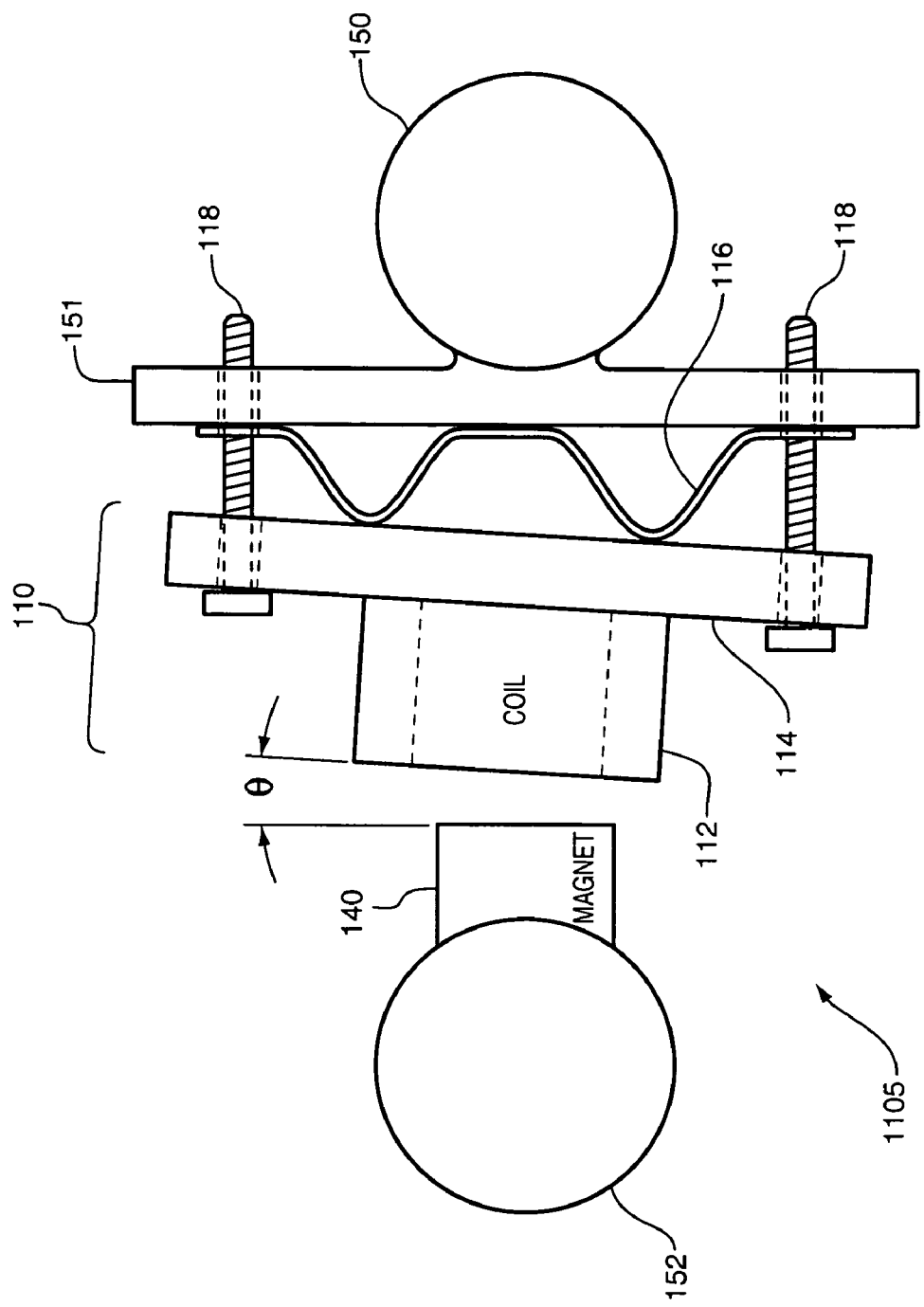
FIG. 11 shows a flow meter pickoff assembly wherein the adjustment means comprises another embodiment of a deformable spacing shape.

FIG. 11 shows a flow meter pickoff assembly 1105 wherein the adjustment means 116 comprises another embodiment of a deformable spacing shape 116. The deformable spacing shape 116 in this embodiment comprises a resilient deformable material, and is formed in a curved shape to facilitate a return to an original shape in the absence of compression on the deformable spacing shape 116. Other geometries of the deformable spacing shape 116 are contemplated and included within the scope of the accompanying claims.

Figure 12:
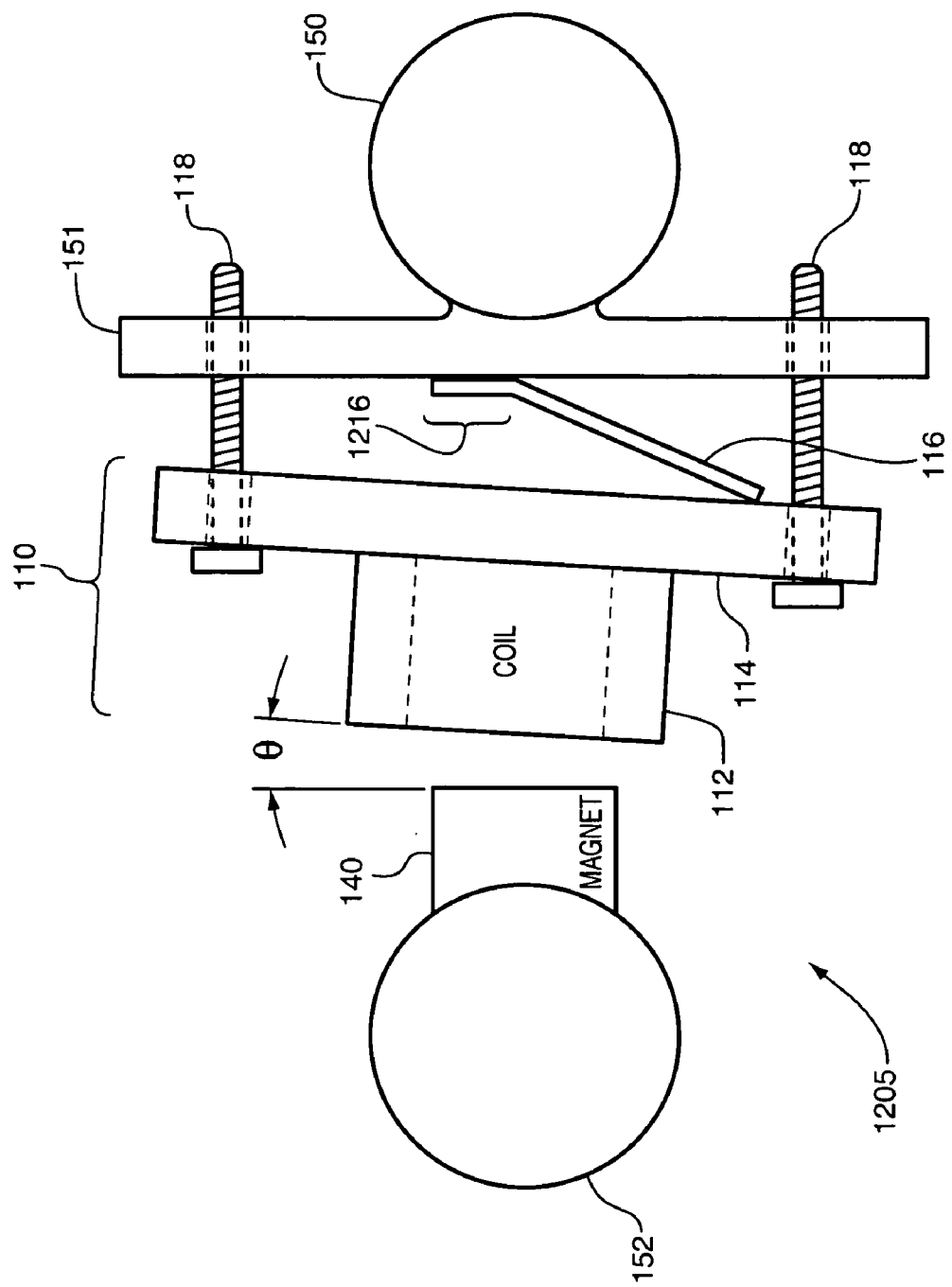
FIG. 12 shows a flow meter pickoff assembly wherein the adjustment means comprises a deformable tab.

FIG. 12 shows a flow meter pickoff assembly 1205 wherein the adjustment means 116 comprises a deformable tab 116. The deformable tab 116 includes a portion 1216 that is welded or bonded to either the mounting device 151 or to the first pickoff sensor half 110. As a result, the deformation of the deformable tab 116 pivots around the portion 1216. The deformable tab 116 can optionally be formed of a resilient, deformable material.

Figure 13:
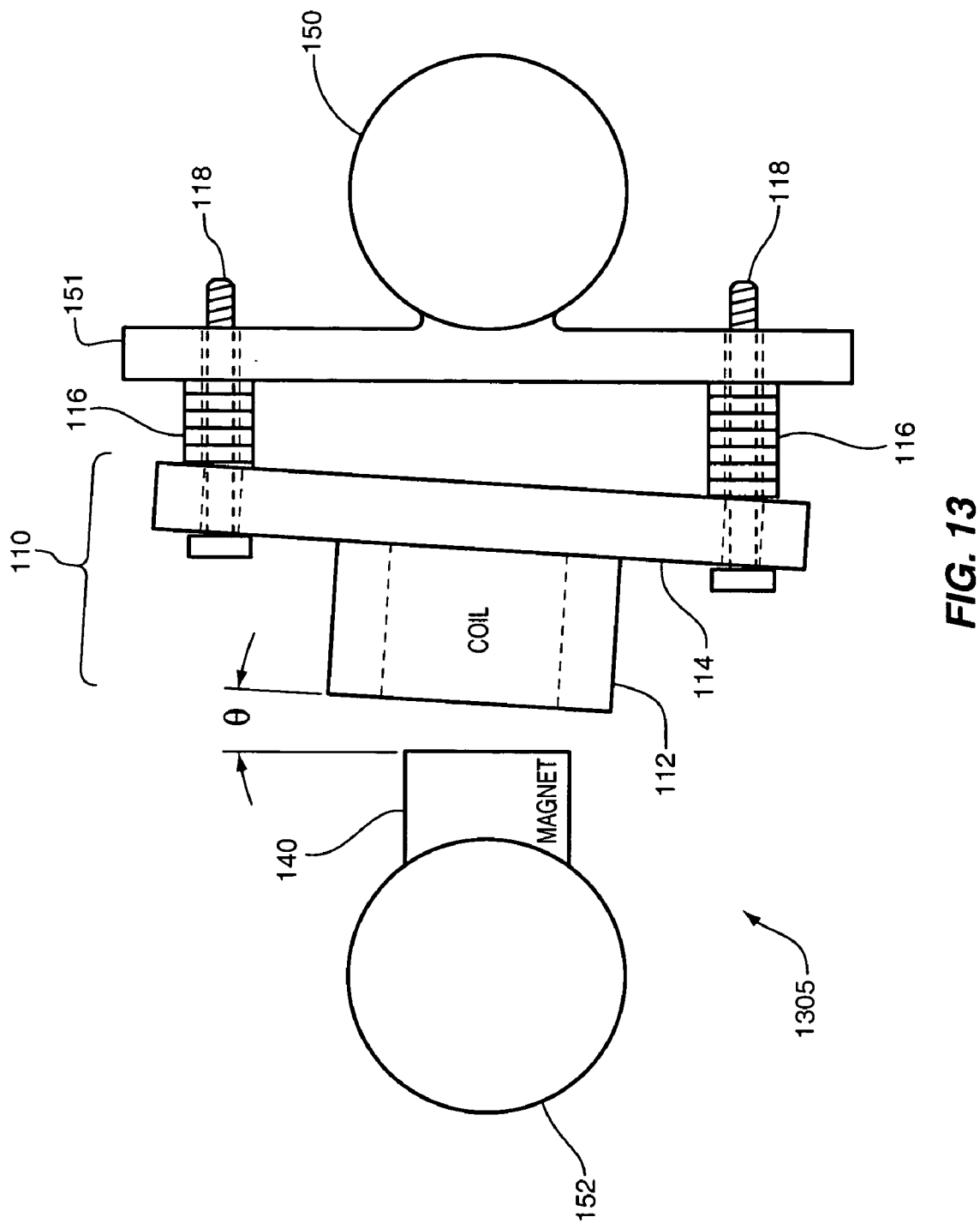
FIG. 13 shows a flow meter pickoff assembly wherein the adjustment means comprises a plurality of spacers.

FIG. 13 shows a flow meter pickoff assembly 1305 wherein the adjustment means 116 comprises a plurality of spacers 116. The spacers 116 can be selected and added to achieve a desired orientation of the first pickoff sensor half 110. The spacers 116 can be of any desired thickness. In addition, multiple different spacer thicknesses can be used in order to achieve a desired spacing. In the embodiment shown, the spacers 116 include an aperture that receives a fastener 118. As a result, through the use of two or more fasteners 118 and associated spacers 116, the orientation of the first pickoff sensor half 110 can be adjusted.

Figure 14:
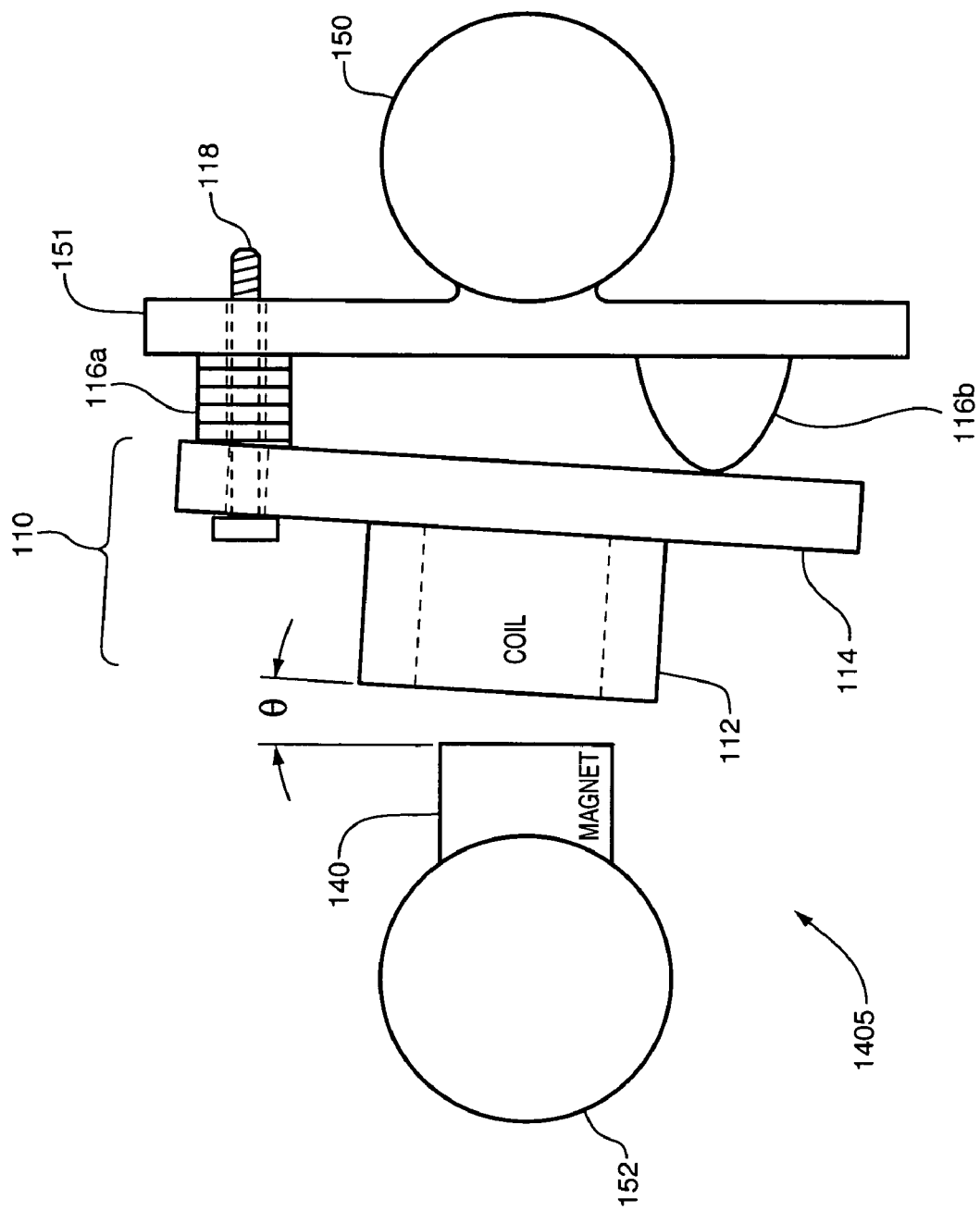
FIG. 14 shows a flow meter pickoff assembly wherein the adjustment means comprises spacers and a projection such as a rib or bump.

FIG. 14 shows a flow meter pickoff assembly 1405 wherein the adjustment means 116 comprises spacers 116a and projection 116b such as a rib or bump. In this embodiment, the spacers 116a can be used to achieve a desired orientation of the first pickoff sensor half 110 with respect to the rib or bump 116b (i.e., the relative angle θ can be changed by adding or subtracting spacers 116a). Alternatively, the projection 116b can be replaced by a deformable shape or tab.

Figure 15:
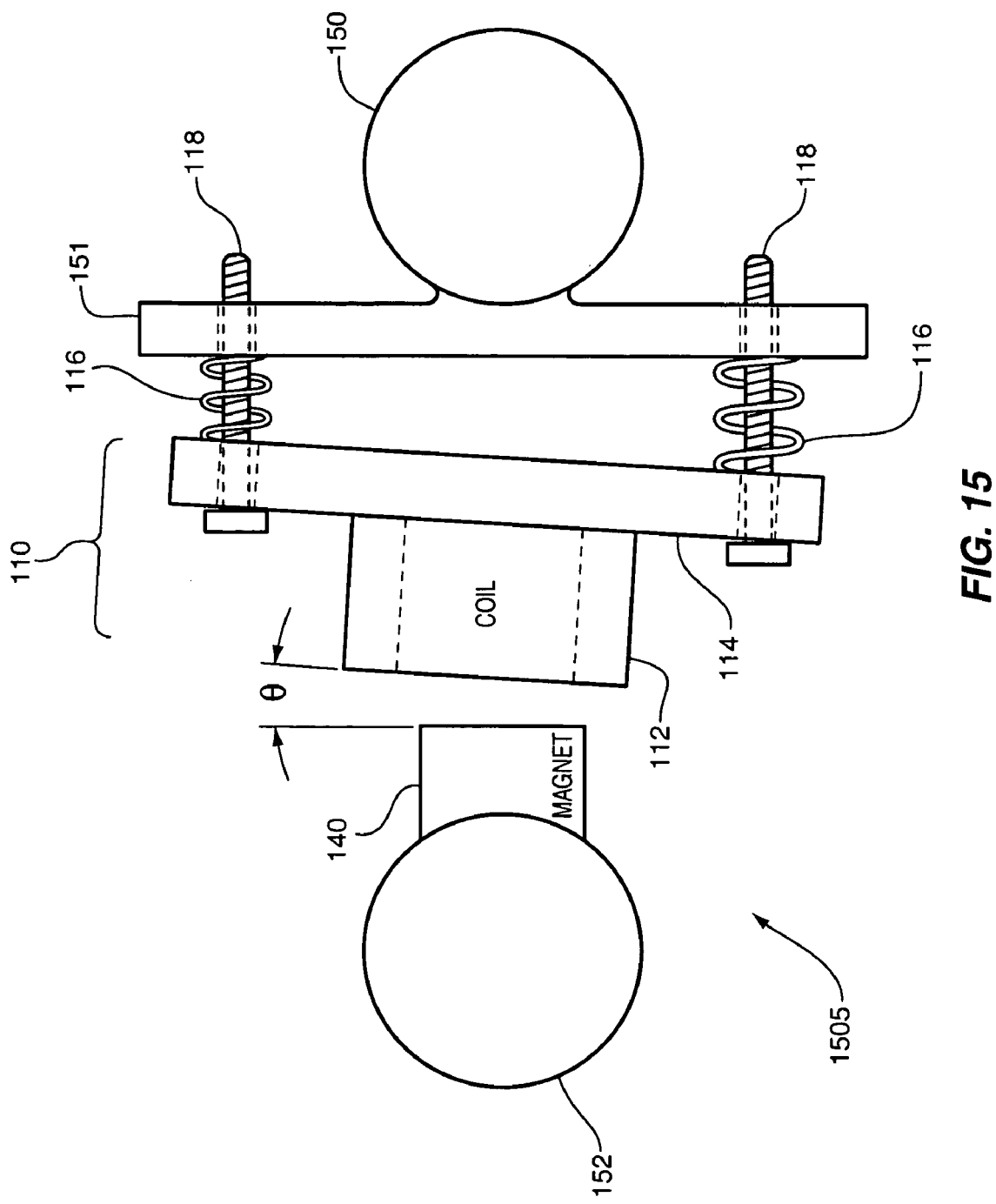
FIG. 15 shows a flow meter pickoff assembly wherein the adjustment means comprises one or more springs.

FIG. 15 shows a flow meter pickoff assembly 1505 wherein the adjustment means 116 comprises one or more springs 116. The one or more springs 116 are positioned between the first pickoff sensor half 110 and the mounting device 151, such as straddling a fastener 118. In this embodiment, the fasteners 118 can be used to change the orientation of the first pickoff sensor half 110 against the biasing forces provided by the springs 116. If three or more fasteners 118 are employed, the first pickoff sensor half 110 can be oriented along two adjustment axes.

Figure 16:
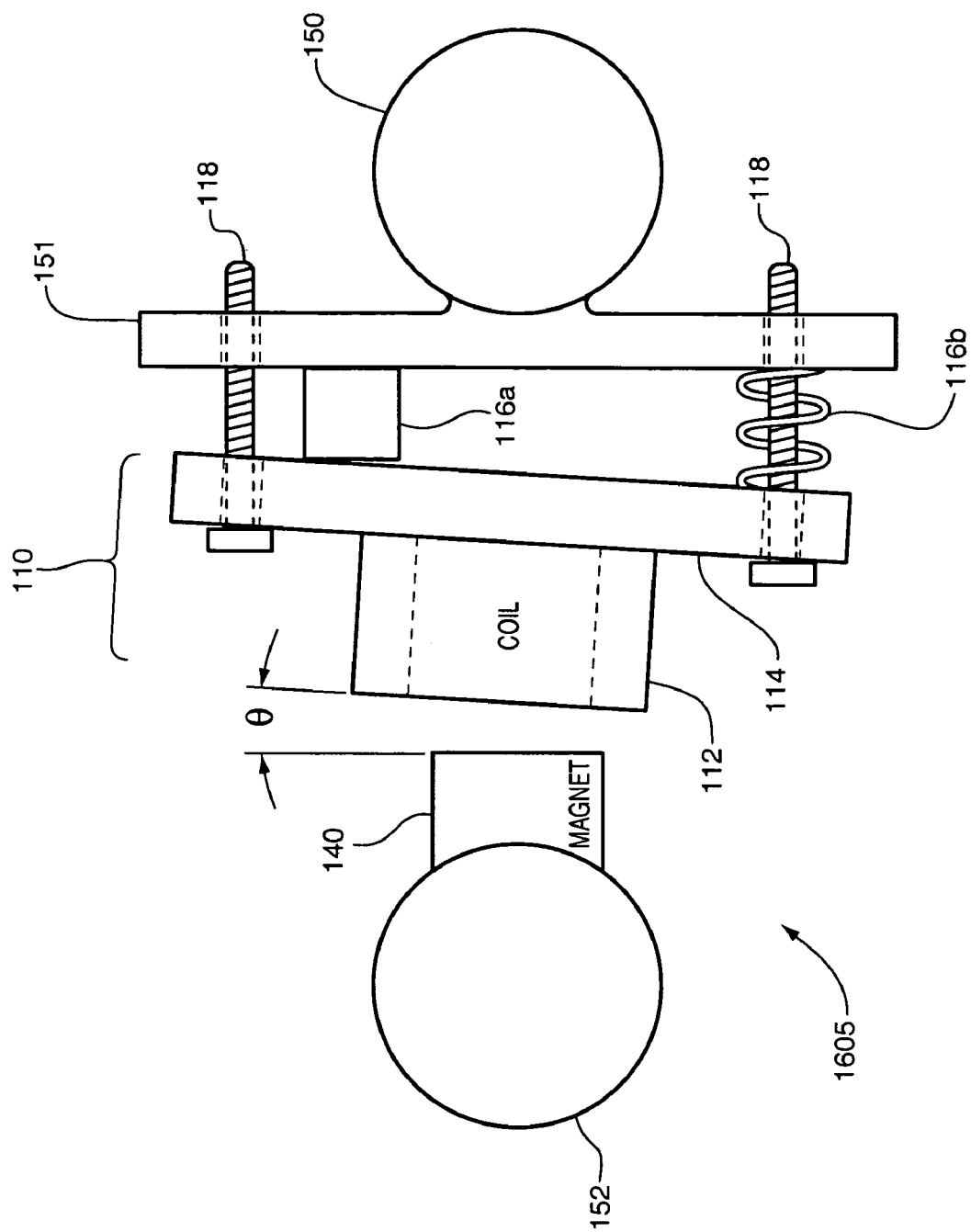
FIG. 16 shows a flow meter pickoff assembly wherein the adjustment means comprises a projection, such as a rib or bump, and at least one spring.

FIG. 16 shows a flow meter pickoff assembly 1605 wherein the adjustment means 116 comprises a projection 116a, such as a rib or bump, and at least one spring 116b. The at least one spring 116b can be held in position by a corresponding fastener 118 passing through the spring 116b. The first pickoff sensor half 110 can pivot on the rib or bump 1116a, as controlled by the at least one spring 116b and the fasteners 118. Alternatively, the at least one spring 116b can be replaced by a deformable shape or tab.

It should be understood that other embodiments and variations of the adjustment means are contemplated and included within the scope of the invention and the accompanying claims.

The zero offset nulling according to the invention can be implemented according to any of the embodiments in order to obtain several advantages, if desired. The zero offset nulling according to the invention provides a simple, low cost, and effective mechanical nulling. The zero offset nulling of the flow meter enables the zero offset to be compensated for or eliminated. The zero offset nulling according to the invention, by compensating for or eliminating the zero offset, makes the flow meter less sensitive to changes in temperature.

We claim:

1. A flow meter pickoff assembly for nulling a flow meter zero offset, the flow meter pickoff assembly comprising:
    a mounting device affixed to a first flow meter portion of a flow meter;
    a first pickoff sensor half adjustably affixed to the mounting device and configured to interact with a second pickoff sensor half affixed to a second flow meter portion, wherein at least one relative angle of the first pickoff sensor half in relation to the second pickoff sensor half can be adjusted by adjusting the first pickoff sensor half to the mounting device according to at least one adjustment axis; and
    an adjustment means for enabling the first pickoff sensor half to adjust with respect to the mounting device along the at least one adjustment axis in order to adjust the at least one relative angle.

2. The flow meter pickoff assembly of claim 1, wherein the first pickoff sensor half is adjustably affixed to the mounting device by one or more threaded fasteners.

3. The flow meter pickoff assembly of claim 1, wherein the adjustment means comprises a portion of the first pickoff sensor half.

4. The flow meter pickoff assembly of claim 1, wherein the adjustment means comprises a portion of the mounting device.

5. The flow meter pickoff assembly of claim 1, wherein the at least one relative angle comprises two relative angles and wherein an orientation of the first pickoff sensor half can be adjusted relative to the mounting device according to two adjustment axes.

6. The flow meter pickoff assembly of claim 1, with the adjustment means comprising a protrusion positioned between the first pickoff sensor half and the mounting device.

7. The flow meter pickoff assembly of claim 1, with the adjustment means comprising an at least partially elongated ridge positioned between the first pickoff sensor half and the mounting device.

8. The flow meter pickoff assembly of claim 1, with the adjustment means comprising a spacer positioned between the first pickoff sensor half and the mounting device.

9. The flow meter pickoff assembly of claim 1, with the adjustment means comprising a spacer positioned between the first pickoff sensor half and the mounting device and wherein the spacer is formed of an electrically non-conductive material.

10. The flow meter pickoff assembly of claim 1, wherein the adjustment means is substantially compressible.

11. The flow meter pickoff assembly of claim 1, wherein the adjustment means comprises a deformable spacing shape.

12. The flow meter pickoff assembly of claim 1, wherein the adjustment means comprises a deformable tab.

13. The flow meter pickoff assembly of claim 1, wherein the adjustment means comprises a plurality of spacers.

14. The flow meter pickoff assembly of claim 1, wherein the adjustment means comprises a one or more spacers and a projection.

15. The flow meter pickoff assembly of claim 1, wherein the adjustment means comprises one or more springs.

16. The flow meter pickoff assembly of claim 1, wherein the adjustment means comprises a projection and at least one spring.

17. A flow meter adjustment method for nulling a flow meter zero offset, the method comprising:
affixing a mounting device to a first flow meter portion of a flow meter;
adjustably affixing a first pickoff sensor half to the mounting device, with the first pickoff sensor half being configured to interact with a second pickoff sensor half affixed to a second flow meter portion, wherein at least one relative angle of the first pickoff sensor half in relation to the second pickoff sensor half can be adjusted by adjusting the first pickoff sensor half to the mounting device according to at least one adjustment axis; and
providing an adjustment means for enabling the first pickoff sensor half to adjust with respect to the mounting device along the at least one adjustment axis in order to adjust the at least one relative angle.

18. The method of claim 17, wherein the first pickoff sensor half is adjustably affixed to the mounting device by one or more threaded fasteners.

19. The method of claim 17, wherein the adjustment means comprises a portion of the first pickoff sensor half.

20. The method of claim 17, wherein the adjustment means comprises a portion of the mounting device.

21. The method of claim 17, wherein the at least one relative angle comprises two relative angles and wherein an orientation of the first pickoff sensor half can be adjusted relative to the mounting device according to two adjustment axes.

22. The method of claim 17, with the adjustment means comprising a protrusion positioned between the first pickoff sensor half and the mounting device.

23. The method of claim 17, with the adjustment means comprising an at least partially elongated ridge positioned between the first pickoff sensor half and the mounting device.

24. The method of claim 17, with the adjustment means comprising a spacer positioned between the first pickoff sensor half and the mounting device.

25. The method of claim 17, with the adjustment means comprising a spacer positioned between the first pickoff sensor half and the mounting device and wherein the spacer is formed of an electrically non-conductive material.

26. The method of claim 17, wherein the adjustment means is substantially compressible.

27. The method of claim 17, wherein the adjustment means comprises a deformable spacing shape.

28. The method of claim 17, wherein the adjustment means comprises a deformable tab.

29. The method of claim 17, wherein the adjustment means comprises a plurality of spacers.

30. The method of claim 17, wherein the adjustment means comprises a one or more spacers and a projection.

31. The method of claim 17, wherein the adjustment means comprises one or more springs.

32. The method of claim 17, wherein the adjustment means comprises a projection and at least one spring.

* * * * *

UNITED STATES PATENT AND TRADEMARK OFFICE
CERTIFICATE OF CORRECTION

PATENT NO. : 6,997,033 B2 Page 1 of 1
APPLICATION NO. : 10/771273
DATED : February 14, 2006
INVENTOR(S) : Martin Andrew Schlosser et al.

It is certified that error appears in the above-identified patent and that said Letters Patent is hereby corrected as shown below:

Column 8, line 17, replace "1116a" with --116a--.

Signed and Sealed this

Fourth Day of December, 2007

JON W. DUDAS
*Director of the United States Patent and Trademark Office*